US008799212B2

(12) United States Patent  (10) Patent No.: US 8,799,212 B2
Rusch  (45) Date of Patent: Aug. 5, 2014

(54) REPOSITORY SYNCHRONIZATION IN A RANKED REPOSITORY CLUSTER

(75) Inventor: Gert F. Rusch, Eppelheim (DE)

(73) Assignee: SAP AG, Walldorf (DE)

( * ) Notice: Subject to any disclaimer, the term of this patent is extended or adjusted under 35 U.S.C. 154(b) by 1322 days.

(21) Appl. No.: 11/648,300

(22) Filed: Dec. 29, 2006

(65) Prior Publication Data

US 2008/0162588 A1    Jul. 3, 2008

(51) Int. Cl.
*G06F 17/30* (2006.01)
(52) U.S. Cl.
USPC ............................ 707/610; 707/611; 707/612
(58) Field of Classification Search
USPC .................. 707/1, 8, 10, 104.1, 201; 711/118
See application file for complete search history.

(56) References Cited

U.S. PATENT DOCUMENTS

| 6,567,893 | B1 * | 5/2003 | Challenger et al. ........... 711/118 |
| 6,581,075 | B1 * | 6/2003 | Guturu et al. .................. 707/201 |
| 2005/0149615 | A1 * | 7/2005 | Nedimyer et al. ............ 709/202 |

OTHER PUBLICATIONS

International Search Report & Written Opinion mailed Apr. 22, 2008 for International Application No. PCT/EP2007/010887.
Saito, Consistency Management in Optimistic Replication Algorithms, Jun. 15, 2001, XP002241278, Retrieved from the Internet on May 12, 2003 URL: citeseer.nj.nec.com/saito01consistency.html> cited in PCT ISR&WO mailed Apr. 22, 2003.

* cited by examiner

*Primary Examiner* — Anteneh Girma
(74) *Attorney, Agent, or Firm* — Blakely, Sokoloff, Taylor & Zafman, LLP

(57) ABSTRACT

Methods and apparatuses enable synchronization of shared data in a cluster of ranked repositories. A publisher repository issues a change message indicating a change in shared data. A subscriber repository receives the change message and determines whether the change message is previously known to the subscriber repository. If the message is previously known, the subscriber repository terminates the change message. If the message is not previously known, the subscriber repository republishes or sends a change message in response to receiving the change message. The republished message can be republished in a variety of ways based on the characteristics of the change message and characteristics of the subscriber repository.

19 Claims, 4 Drawing Sheets

REPOSITORY SYNCHRONIZATION IN A RANKED REPOSITORY CLUSTER

FIELD

Embodiments of the invention relate to repository synchronization, and more particularly to synchronization of a network of repositories each having a state and a ranking.

BACKGROUND

Information technology (IT) system landscapes frequently rely on multiple repositories in the system for storing and sharing information. Information stored in the repositories may need to be shared among multiple applications in distributed systems. In such cases, central repositories are often used. A central repository refers to operating one or more physical storage devices as a single repository that stores all information for the system. The amount of information can often reach into the multiple terabytes. The operation of a central repository guarantees the consistency of the repository content in a simple way. However, the hosting system must be highly available because of the large number of repository clients spread over the system landscape. The robustness of a central repository solution can be significantly limited due to the performance requirements placed on the single repository. The result is often an increase in system cost, system complexity, and upkeep effort.

DESCRIPTION OF THE DRAWING

The following description includes discussion of a figure having illustrations given by way of example of implementations of embodiments of the invention. The drawing should be understood by way of example, and not by way of limitation.

DETAILED DESCRIPTION

Figure 1:
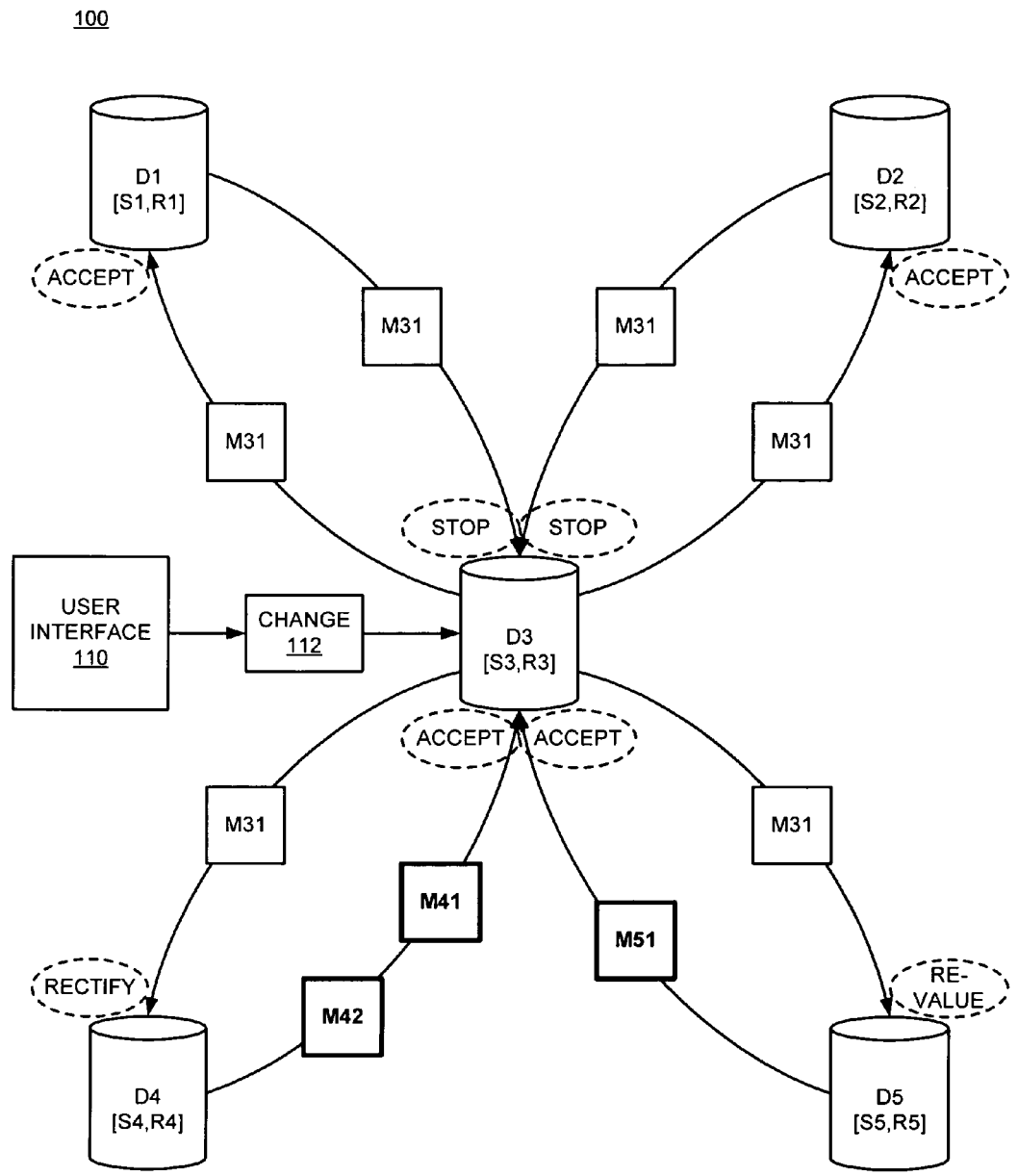
FIG. 1 is a block diagram of an embodiment of a system having ranked repositories that exchange synchronization messages.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

As an alternative to a central repository, a distributed repository system or a network of repositories can allow for the synchronizing of content across repositories to allow all repositories to share the same "virtual content" or "virtual data." As used herein, virtual content or virtual data refers to content shared among participating repositories, which may be some or all of the data stored in a repository. Synchronization refers to making the virtual or shared content consistent across participating repositories. Synchronization can be enhanced by ranking the repositories and sharing and processing messages indicating changes to data, as described herein. Note that the discussion herein assumes following three design principles, although other implementations are possible. The design principles are: 1) the virtual content is copied between repositories rather than having hyperlinks; 2) the content synchronization is performed asynchronously to the original changes; and, 3) no central lock instance is required.

As described herein, each repository is independent of the operation of the other repositories, and any repository can be stopped at any time. Thus, there is no requirement for high availability, and the virtual content is continuously available. The repositories are temporarily unsynchronized when changes are performed. In some cases, different changes to the same data are performed in parallel from different entry points (repositories) in the system. Conflicts between parallel changes at different repositories are resolved as a result of the flow of synchronization messages rather than immediately. Thus, temporary inconsistencies may be present at the system. However, given a scenario where changes are made relatively infrequently (on the order of seconds to minutes) rather than frequently (on the order of milliseconds), the system can be considered synchronized for practical purposes.

Repositories can be organized into a "synchronization cluster," which is performed as part of a system configuration. Each repository is assigned a rank within the cluster. Multiple repositories can share the same rank, or repositories can all have different ranks. In one embodiment, synchronization of the ranked repositories involves the exchange of synchronization message between participating repositories. After the flow of synchronization message exchange comes to an end, there should be harmonization of content among the repositories.

In one embodiment, the topology of a synchronization cluster is defined by subscribe relations between the repositories. Each subscribe relation defines a sender (publisher) and a receiver (subscriber) of a synchronization message. The flow of synchronization messages is directed by the subscribe relations. In one embodiment, the system is configured according to the "unique path principle," which requires a unique message path between any sender and receiver. In general, synchronization messages are sent from publishers to their subscriber(s). In one embodiment, the system is bidirectional, and a publisher can also be a subscriber of one of its subscribers. Thus, in one message exchange, a repository acts as a publisher as it sends a message to another repository. A reverse exchange is also possible where the repository then acts as a subscriber to receive a message from the other repository. In one embodiment, the system is unidirectional, which means that message flow only occurs in one direction, and a repository is not a subscriber of another repository with which is also has a publisher relation.

In general, synchronization occurs in response to a change that is received at a repository. The repository then indicates the change by publishing a change message to its subscribers. Each subscriber receives the change message and processes it. If a subscriber has already received the change message, it terminates the message, and does not republish the message. If the subscriber has not received the message, it determines whether to implement the change. In one embodiment, determining whether to implement the change includes determining what rank is associated with the change message, and whether the change conflicts with local data of the receiving subscriber. The subscriber then sends a change message or republishes the change message in response to receiving the change message. The sending or republishing can be performed under one of multiple scenarios. The republishing may depend also upon the rank associated with the change message and whether the data conflicts with the local data. The operations and flow of the change messages is described more fully below with respect to the figures.

In one embodiment, as described in more detail below, a conflict is determined to exist when the subscriber repository state differs from the original object state indicated in the change message. As used herein, state refers to the properties or configuration of data, especially data objects/business objects, including object behavior. A difference in data may not necessarily result in a conflict, rather, a conflict results from an incompatibility in data states. If the subscriber repository has a rank lower or equal to the rank associated with the change message, conflict resolution can be performed simply by proceeding with the change regardless of the differences. In the case of a conflict where the subscriber repository has a higher rank, in one embodiment, conflict resolution favors the higher rank. Thus, the proposed change is rejected at the subscriber repository. In order to conform the system to the higher ranked repository, the higher ranked subscriber repository can generate and publish one or more correction messages. The content of a correction message can be a reverse operation as well as modified operations. If the environment of a conflicting event has to be considered for the rectification, the easiest correction message is the request to synchronize the environment with the state of the current sender. Such a "state synchronization" message may not contain an event on the publisher side, but will cause the receiver to read the sender's current repository state.

After all synchronization messages are propagated through the system, the repository with the highest rank determines the final object state for the whole cluster. Changes in the synchronization cluster are accepted if they do not conflict with the repository having the highest rank. Thus, as a practical matter, changes made at the repository with the highest rank are the changes that carry the most weight in the system.

FIG. 1 is a block diagram of an embodiment of a system having ranked repositories that exchange synchronization messages. System 100 includes five repositories, D1-D5, and represents a repository synchronization cluster. Note that the number of repositories selected is completely arbitrary for purposes of discussion of the principles of synchronization among ranked repositories. A system may include more or fewer repositories. Each repository, D1-D5 includes a state, S1-S5, respectively, and a rank, R1-R5, respectively. The state of each repository represents the state of data at the repository. In a completely synchronized system, all states, S1-S5, would be equal. However, it cannot be assumed that the states are equal in a functioning system, given that repositories may be brought in or out of the system at any time. For example, a repository may be temporarily taken down for configuration upgrades, etc., and become unavailable and then be brought back into the system some time later. It is not assumed that the state of the repository would necessarily be consistent under such a scenario. Differences can also be caused by parallel changes at different repositories to the same virtual information, or by unidirectional synchronization in certain topologies (addressed in more detail below). Also, a new repository may be added to a system to upgrade the system. Thus, the content states, S1-S5, of the repositories may be all equal, partially different, or all different.

The rank of each repository represents its relative importance for purposes of conflict resolution. Thus, repository D2 has a higher rank than repository D1, and a lower rank than repository D3. In case of a conflict, action by D2 would take precedence over an action by D1, but an action by D3 would take precedence over the action by D2.

In response to a state change at a repository, the repository sends a change message about the state change(s). For example, in system 100, user interface 110 is used to generate change 112, which changes state S3, because user interface 110 has access to repository D3. In response to the change of S3, repository D3 sends change message M31 to its subscribers. In one embodiment, each message includes metadata describing a context of the message, for example, in addition to the event of the message (the state change to S3), message M31 is identified as being message number 1 (hence, message M31) from repository D3 (hence, message M31). In general, messages may be identified as Mij, where i represents the repository ID, and j represents the message number generated at that repository. In one embodiment, the state change to S3 is represented in message M31 as an event consisting of an original object state, an operation, and the final object state. In one embodiment, all events in a message are stored in order of their original appearance in records forming what may be referred to as a "change log." The event data may be extended by metadata to affect how receiving repositories process the event data, as described below.

The following provides examples of types of metadata that may be included in a change message. Note that the following does not represent all metadata that could be included, nor should each item listed here be understood as being necessary. In one embodiment, a change message includes metadata including: the sender name or identifier (which will be uniquely assigned to each repository in the synchronization cluster); a message number indicating an identity of the change message from the sender, which will be unique in the sender repository (e.g., ordered sequentially according to when it was generated); and a message rank (e.g., an integer) corresponding to the rank of the repository issuing the change message. In one embodiment, the sender identifier (ID) and message number together form a "message ID," which uniquely identifies the message from any other message in the cluster. Thus, for example, message M31 is unique as the first message sent from repository D3. Any subsequent message from repository D3 could be identified as M32, M33, etc. Messages generated from repository D4 could be indicated M41, M42, etc.

In one embodiment, change messages are not sent to specific target repositories or subscribers, but rather are simply published or indicated to the subscribers. Subscribers of a repository are other repositories that have subscribed for change notifications from the particular repository. Subscribers will receive the change message. Thus, if repositories D1, D2, D4, and D5, for example, have all subscribed to repository D3, they will receive change messages from D3. In one embodiment, receiving the change message includes the generating repository indicating the change to the subscribers, who then read from the publisher. However, the particular messaging technique employed is not relevant, and other messages techniques could be used.

In one embodiment, when a new subscriber relation is defined (e.g., through administrative configuration of system 100), an initial content merge process can be invoked. The subscriber evaluates the initial synchronization point and synchronizes the current state of all objects in the publisher repository. For example, assume that repository D2 is newly added as a subscriber to repository D3. With an initial content merge, D2 could determine its initial state and synchronize its state with the state of all objects in repository D3. Parallel changes in repository D3 could be allowed at the same time as a content merge, seeing that a change message would be indicated, and D2 could read all change messages and perform a state change accordingly after initial content merge.

Incremental message transfer is initiated by a publisher repository to all subscribers, including those that may be finished merging. For example, repository D3 may indicate to, or inform its subscribers, D1, D2, D4, and D5 that a change has happened. In one embodiment, a simple change trigger message is sent to indicate a change has happened, without necessarily providing information regarding the change. In response to receiving the notification, in one embodiment, repositories D1, D2, D4, and D5 poll repository D3 for change messages. The current synchronization point may be kept on the subscriber side for this purpose. In response to the polling, repository D3 transfers change message M31, which may be transferred in chunks if the volume or size exceeds a limit or threshold. In one embodiment, in addition to polling for the change message associated with the notification, the subscriber polls actively for other change messages that may not have been received. Thus, notifications lost due to an unreachable subscriber can still be propagated through the system. In one embodiment, technical infeasibility or infrastructure reasons may prevent the use of a notification message mechanism. In such an implementation, a regular, e.g., scheduled, polling request by a subscriber for change messages can be employed.

When the subscriber receives the change message, the subscriber processes the message, which may produce one of multiple effects. If a change message has already been received (e.g., in a bidirectional implementation, a subscriber may receive an indication for a change message that actually originated at the subscriber itself), the subscriber terminates the message, and no action is taken on the change message. Other effects are illustrated with reference to system 100.

Repository D3 sends change message M31 to repository D1, which processes the message. Assume the change indicated in message M31 does not conflict with state S1 of repository D1. A conflict occurs when different data exists for the same object. More specifically, in one embodiment, a conflict results if the repository state differs from the original object state indicated in the event of the change message. More information for a given object may not necessarily be a conflict. Because the change does not conflict, repository D1 accepts change message M31, and implements the change. Repository D1 then republishes change message M31, which it sends to repository D3 as a subscriber (note that system 100 is a bidirectional implementation). Because change message M31 is already known to repository D3, D3 terminates the message, which terminates the flow of the message in that section of system 100. Repository D3 can know that change message M31 is already known to it by the message ID as described above, or a comparable identification mechanism. The message termination can prevent the endless flow of change messages.

Repository D3 also sends change message M31 to repository D2. Assume that the change indicated in change message M31 conflicts with the data in repository D2. Given the conflict, repository D2 determines what rank is associated with change message M31, and compares the rank with its own rank. In one embodiment, a change message is assigned the rank of the repository that generated it. Repository D2 determines that the message rank is 3, while its own rank is 2. Thus, the message outranks the receiving repository. Because change message M31 is higher in rank than repository D2, D2 accepts and implements the change. After accepting change message M31, repository D2 republishes the message, which is sent to repository D3, where the message is terminated.

As described above, repositories D1 and D2 each "republished" message M31 by forwarding the message to their respective subscribers (repository D3 is a subscriber to each of them). Forwarding refers to accepting and processing the change and then sending the message to its subscribers. Forwarding specifically refers to sending out the change message without changing the message (both the message ID and the event are unchanged). Note that the "accepting," or receiving, processing, and forwarding the change does not necessarily change the state of the receiving repository. In the case of this example, both S1 and S2 were changed to synchronize to the state indicated in change message M31, but that is not necessarily the case for each time a message is accepted.

Republishing a change message can also refer to other types of republishing. Namely, republishing can refer to revaluing a message, as described in reference to repository D5, and rectifying, as described in reference to repository D4. Change message M31 is sent from repository D3 to repository D5, which processes the message to determine if the change conflicts with state S5 of repository D5. Repository D5 may determine that the rank of change message M31 is lower than its rank (which is 5). In one embodiment, repository D5 upgrades change message M31 to harmonize concurrent changes. Repository D5 may change its state to the state indicated in change message M31, and then generate a new message having a new message ID. Note that D5 leaves the event data unaffected, but issues message M51 having the same event data with a higher rank. Thus, because repository D5 with a higher rank than the originating repository received the change and implemented it, a change is made in state S5 of repository D5. Thus, change message M51 is sent to indicate the state change. Repository D3 is a subscriber to repository D5, and receives change message M51. Repository D3 would then accept change message M51, but not need to make a state change, since state S3 is consistent with the change indicated in change message M51. Repository D3 would then republish (forward) change message M51 to its subscribers, which would also process the message. Assuming the subscribers had already changed their states according to change message M31, they would each accept change message M51, but not require any state changes. Change message M51 would be terminated at repository D3 from D1 and D2, and would be terminated at repository D5 from D3.

Republishing a change message can refer to rectifying a conflict with a received change message. For example, assume repository D4 has a conflict with change message M31. Note that different scenarios are described with reference to system 100; however, although all could potentially occur simultaneously, not all are to be assumed to happen simultaneously—all are simply possible scenarios that may occur in a system such as system 100. Thus, assume that repository D4 has a conflict with change message M31 (e.g., because of parallel changes and/or changes incompatible with a state of data at the higher-ranked repository). Repository D4 determines that the conflict exists, and determines that the rank of D4 is higher than the rank of change message M31. Instead of implementing the suggested change, in one embodiment, repository D4 generates one or more correction message (indicated by M41 and M42). Instead of forwarding the original event of change message M31, M41 and M42 may contain reverse events and/or other operations.

Note that repositories D4 and D5 are able to republish change message M31 with a different message (namely, M41 and M42, and M51), whereas repository D2 did not republish with a different message despite the assumed presence of a conflict. In one embodiment, any secondary messages, or different messages generated on republishing, must have a higher rank than the original message in order to be sent. Thus, repository D2 may be prevented from republishing with a different message, because it has a lower rank than change message M31. However, republished message M41 and M51 were generated by repositories with higher ranks, and so they could be sent. Having such a limit on the republishing of secondary message reduces the risk that the total amount of exchanged messages will explode in volume.

In one embodiment, the system follows the unique path principle, and subsequent messages keep their order on each individual message path. There would not be correlation between different communication channels. Following the unique path principle may avoid cases of receiving the same message twice. Additionally, if a message is varied on the way to a particular repository, a "corrected" message could reach a repository prior to an original message, which may result in inconsistency with the system.

Figure 2:
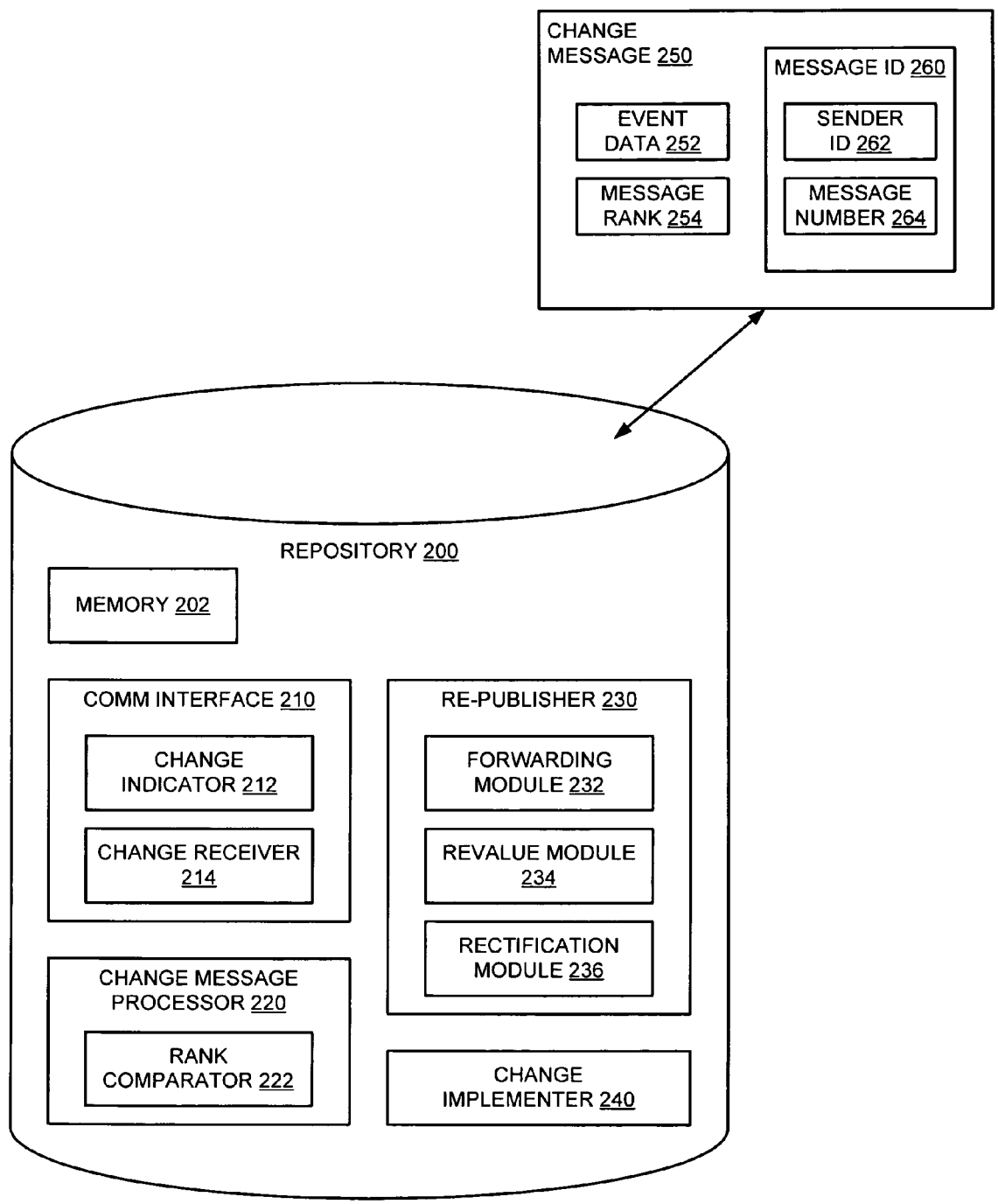
FIG. 2 is a block diagram of an embodiment of a repository that processes synchronization messages based on rank.

FIG. 2 is a block diagram of an embodiment of a repository that processes synchronization messages based on rank. Repository 200 provides one possible example of any repository described herein. Repository 200 may include hardware and/or software to provide change message processing. In one embodiment, repository 200 includes memory 202 and/or access to memory resource 202 for storing data and/or instructions. Memory 202 represents volatile memory with which repository performs operations, makes determinations, etc.

Repository 200 is illustrated with multiple components that each represents a function or operation of repository 200. Note that other components could exist that are not shown, and not all components shown are necessarily included in every implementation. The functions or features of the components include, or are provided by, one or more means, which may include hardware (e.g., a circuit, a processor executing control functions), software (e.g., a routine, a subsystem, etc.), or some combination.

Repository 200 includes communication (comm) interface 210, which represents hardware and/or software to send and/or receive communications from other entities, for example, from other repositories. Specifically, communication interface 210 can enable repository 200 to receive change messages, such as change message 250. In one embodiment, a change message is indicated by a simple indication message, which may be a message having a specific format, ID, and/or data payload. Such a change indication message can then trigger repository 200 to obtain the change message. On the sending side, repository 200 can generate a change message (e.g., change message 250) when a change to data occurs, and change indicator 212 enables repository 200 to indicate that change to other (subscriber) repositories. As mentioned already, a change indication message may or may not include information regarding what the change is.

Communication interface 210 includes change receiver 214, which enables repository 200 to obtain change messages. Messages could simply be sent directly to repository 200. In one embodiment, a change indication is received, and change receiver enables communication interface 210 to poll the publisher of the change message. Alternatively, change receiver 214 may periodically poll publishers for change messages, which are then received at repository 200.

In one embodiment, repository 200 includes change message processor 220. Change message processor 220 enables repository 200 to identify the contents of a received change message and determine what to do with the contents. For example, a change message may include event data indicating the actual change proposed to be made. The indication of changes can identify data (e.g., an object) and its proposed state. Each item of change in the change message can be compared to local data in the receiving repository to determine if a conflict exists between the proposed change and the local data. In one embodiment, change message processor 220 includes a conflict determiner (not shown) to perform such a comparison of data change content.

Change message processor 220 may also include rank comparator 222, which enables repository 200 to determine a rank of the change message and a rank of repository 200 (e.g., reading data stored at a known address) to determine whether the rank of the change message is higher, lower, or equal to the rank of repository 200. The action by repository 200 on the change message may be influenced by the result or output of the rank comparison.

Repository 200 includes re-publisher 230, which may also be referred to as a publishing module, which enables repository 200 to contribute to the flow of synchronization messages in a system into which it is placed. Re-publisher 230 may include different components depending on what types of publishing responses are available in a given system configuration. In one embodiment, repository 230 can republish change messages under one of multiple scenarios, represented by components forwarding module 232, revalue module 234, and rectification module 236. Forwarding module 232 forwards a message without changing its contents. For example, as described above, a message may be accepted and a change implemented, and the message forwarded to all subscribers of the receiving repository. Revalue module 234 enables repository 200 to republish a change message with a higher rank (e.g., the rank of repository 200). Note that the event or proposed change data can remain unchanged, and the rank of the message be affected. Thus, received change messages can be upgraded to a higher rank and in essence receive a "stamp of approval" by a higher-ranked repository, which can conform the system to the highest ranking repository. Rectification module 236 enables repository 200 to issue a new change message that changes the proposed change to a change that conforms to a data state of repository 200. Thus, if repository 200 is ranked higher than a received change message and there is a data conflict, repository 200 can cause the system to conform to its data state.

Repository 200 includes change implementer 240 to write to the data that is the subject of the event of the change message and thus implement the change. Note that a change can be received asynchronously to a received change message. In one embodiment, repository 200 determines what action to take with respect to a received change message, and republishes the change message in accordance with its determination (e.g., forwarding, rectifying, revaluing). Thus, change implementer can implement a change in parallel with indicating the change message for republishing purposes, after indicating the change message to subscribers, or prior to indicating the change message, change implementer 240 performs the operation proposed and/or implements the proposed change.

Each component described herein may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. For example, a machine readable medium includes recordable/non-recordable media (e.g., read only memory (ROM), random access memory (RAM), magnetic disk storage media, optical storage media, flash memory devices, etc.). Furthermore, storing code on a database or other memory location and offering the code for download over a communication medium may be understood as providing the article of manufacture with such content described herein.

FIG. 2 also illustrates an example of a change message according to any embodiment described herein. Change message 250 includes event data 252, which represents an indication of a change to make to data and identifies the data. The change can be indicated by any of a number of mechanisms, including indicating an operation that was performed to change the data locally at the originating repository, provide a data object, etc. Change message 250 also includes message rank 254. As mentioned previously, message rank 254 one simple assignment method for message rank 254 is to give change message 250 the rank of its originating repository. Message rank 254 can be compared to the rank of a receiving repository in the case of conflict of data state between the receiving repository and change message 250.

In one embodiment, change message 250 includes message ID 260, which represents one or more identifying elements that can be included with change message 250. For example, the elements of message ID 260 can be included as metadata associated with change message 250. Among possible elements, message ID 260 includes sender ID 262, which identifies the originating sender of change message 250, and message number 264, which identifies change message 250 against all other change messages that could be sent from the originating sender. In an implementation where message polling is utilized with message exchange, it may be important to be able to identify change message 250 so that a receiving repository does not have to receive multiple change messages that have already been received. Duplicated work can thus be reduced.

Figure 3A:
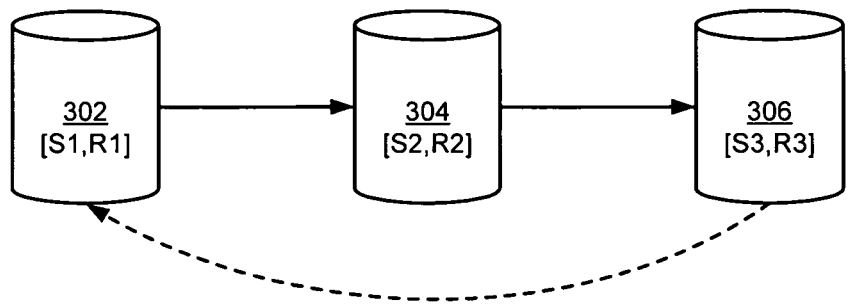
FIGS. 3A-3B are block diagrams of embodiments of repository network architectures.

FIG. 3A is a block diagram of an embodiment of a repository network architecture. System 300 illustrates a chain topology, which may be utilized in a repository synchronization cluster. Repositories 302, 304, and 306 each receive change messages and process the change messages as discussed herein. Note that in a simple chain architecture, the "last" repository in the chain is shown configured with the highest rank (R3, versus R1 and R2 for repositories 302 and 304, respectively). In such a configuration, the repositories further up the chain can simply ignore conflicting change messages. Note that synchronization of data does not necessarily happen for changes implemented at repository 306. In one embodiment, system 300 includes the dashed line as a connection between repository 306 and repository 302. Such a configuration may be referred to as a ring configuration. Note that in a ring configuration, all repositories must be present in order for the flow of configuration messages to function in a unidirectional manner.

Figure 3B:
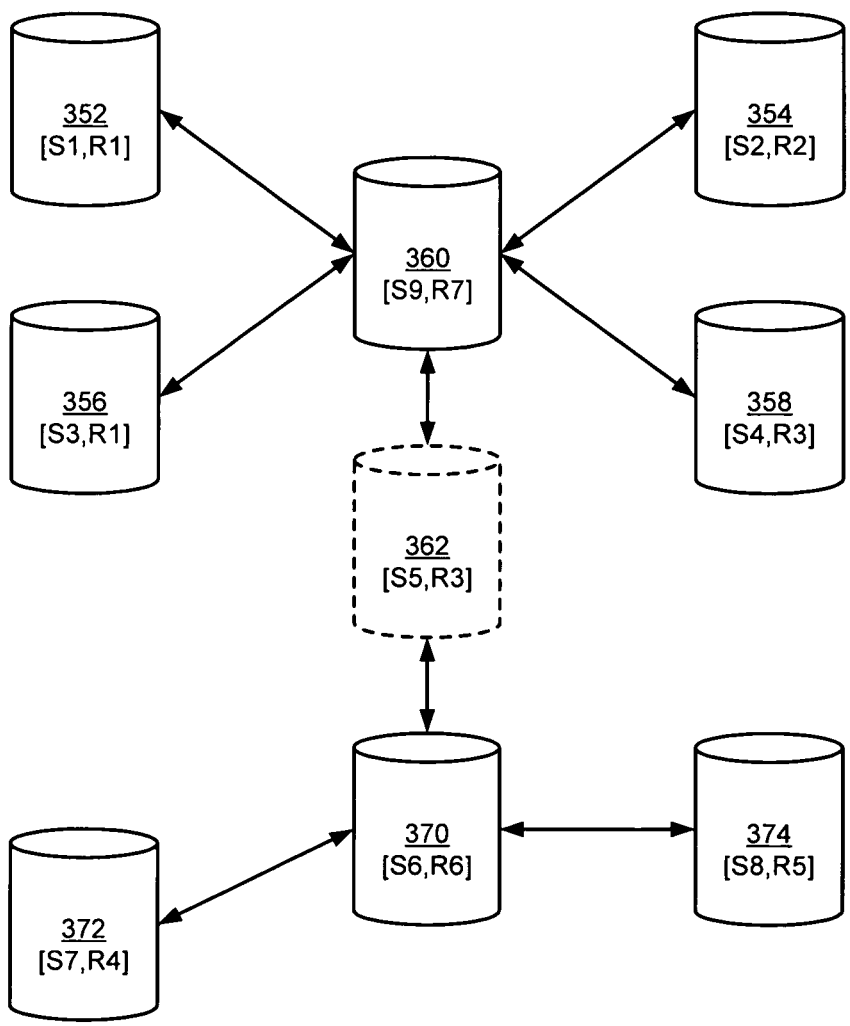

FIG. 3B is a block diagram of an embodiment of a repository network architecture. System 350 illustrates a star topology. In one embodiment, repository 360 has the highest rank of any of the repositories in the cluster. Repositories 352, 354, 356, 358, and 362 are direct subscribers to repository 360. Repositories 370-374 receive change messages propagated from repository 360 and its direct subscribers, even though they are not directly coupled to repository 360. In such a case, repository 362 may act as a bridge between the two subsections of network. In one embodiment, repository 362 does not exist between repositories 360 and 370, but rather repositories 360 and 370 are directly coupled to each other. Note that in system 350, certain repositories are illustrated as having the same priority. For example, repositories 352 and 356 are illustrated as having the same rank (R1). Other configurations are possible. In any configuration either shown or not shown, the propagation of synchronization messages can function as described herein. The repositories generate change messages and send them out. Other repositories receive and process them, terminating the change message if it has been previously received, or otherwise republishing the message.

Figure 4:
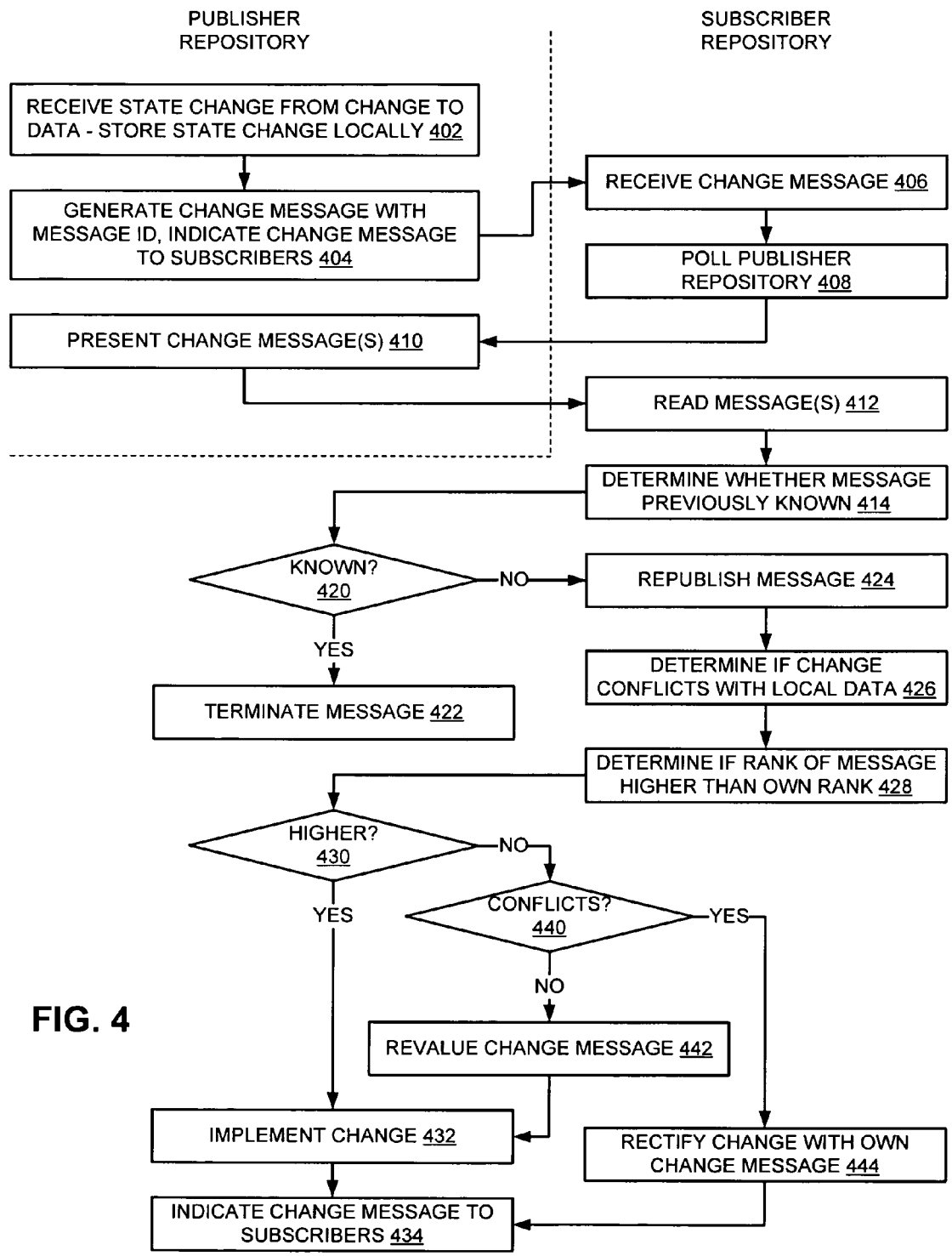
FIG. 4 is a flow diagram of an embodiment of a process for processing a synchronization message.

FIG. 4 is a flow diagram of an embodiment of a process for processing a synchronization message. The flow diagram as illustrated herein provides an example of sequences of various operations. Although shown in a particular sequence or order, unless otherwise specified, the order of the operations can be modified. Thus, the illustrated implementation should be understood only as an example, and operations can be performed in a different order, and some operations may be performed in parallel. Additionally, one or more operations can be omitted in various embodiments of the invention; thus, not all operations are required in every implementation. Other flows of operation are possible.

A publisher repository refers to a repository from which a change message is made available. A subscriber repository receives the change message from the publisher repository. The flow of operations described with respect to FIG. 4 could apply to any implementation of a publisher and subscriber as described herein, and other flows of operation are also possible. The publisher repository receives a state change resulting from a change to data stored at the repository. The publisher repository stores the change locally, 402. The publisher repository generates a change message with a message ID and indicates the change message to one or more subscribers, 404. Note that a message could also simply be forwarded from a publisher repository, thus making certain operations at 402 and 404 applicable to some cases and not all cases.

The subscriber repository receives the change message, 406, which may refer to receiving an indication of a change. Thus, the subscriber repository can poll the publisher repository, 408, to receive a selection of one or more change messages issued by the publisher repository. Polling the publisher can be performed in response to a change indication, or on a periodic basis, or in accordance with a schedule (e.g., at selected/configured times), etc. In response to the polling, the publisher repository presents one or more change messages to the subscriber repository, 410, which can then retrieve the message. Note that multiple change messages may be available to the subscriber repository from the publisher repository. In one embodiment, the subscriber repository selects for reading only the change messages that were issued after a certain point in time, and does not select for reading any change messages that are older than that threshold.

The subscriber repository reads one or more messages, 412, and determines whether the message is previously known to the subscriber repository, 414. A message may be previously known if it was originally published by the subscriber repository, or if it has previously received the message. In one embodiment, prior to reading an entire change message, the subscriber repository reads a hash or a checksum of a message to determine if a message is known. Thus, the entire change message need not be read to determine if the message is known. For messages determined to be known, the entire message need not be read. For messages that are not previously known, the entire message can be read after determining that the message is not previously known. If the message is previously known, 420, the subscriber repository terminates the message, 422, thus stopping the propagation of that message throughout the system. If the message is not previously known, 420, the subscriber repository republishes the message, 424.

Multiple factors might influence the way in which the subscriber repository will republish the message. Among possible implementations, in one embodiment, the subscriber repository determines if the proposed change in the message conflicts with local data, 426, and determines if the rank of the message is higher than the rank of the receiving subscriber repository, 428. If the rank of the message is a higher rank, 430, the subscriber repository implements the change, 432, whether or not there is a conflict. Such an action is according to a design principle that values the state of the repository with the highest rank in the system.

If the rank of the message is not higher than the rank of the subscriber repository, 430, but the message does not conflict with the local state, 440, the message can still be accepted. Specifically, in one embodiment, the message is accepted, and the change message revalued to the higher rank of the subscriber repository, 442. The change may then be implemented by the subscriber repository, 432. If the rank of the message is not higher than the rank of the subscriber repository, 430, but the message does conflict with the local state, 440, the subscriber repository rectifies the change with a new change message generated by the subscriber repository, 444. The new change message can change one or more characteristics or aspects of the original change message (e.g., the rank or event data or content). Thus, the subscriber repository with the higher rank is able to control the state of the virtual data in the cluster. A subscriber repository can generate a new change message based on the rank of the subscriber repository and the rank of the change message. The subscriber repository can then indicate the change message to its subscriber, 434. Note that indicating the change message can refer to indicating a forwarded, unchanged message, a revalued message, or a rectified (changed) change message, depending on what is determined by the processing of the change message by the subscriber repository. Note also that the implementing the change, 432, can occur in parallel or after the indication of the change to its subscribers, 434, or vice versa.

Besides what is described herein, various modifications may be made to the disclosed embodiments and implementations of the invention without departing from their scope. Therefore, the illustrations and examples herein should be construed in an illustrative, and not a restrictive sense. Additional material attached hereto provides further details and more concepts that are part of this disclosure. The scope of the invention can be identified based on the materials herein, as well as the claims that follow.

What is claimed is:

1. A method for synchronizing data in a cluster of repositories, comprising:
   receiving a change message at a first repository from a second repository in a cluster of ranked repositories, the change message indicating a change to a state of an object in the cluster, the change message having a unique identifier that uniquely identifies the change message in a change log of changes occurring within the cluster, wherein the unique identifier of the change message includes an indication of rank, the rank being equal to the rank of a repository that originated the change message, where higher ranking is favored if the change message indicates an object state conflict;
   determining with a processor of the first repository whether the change message has previously been received at the first repository by reading a value identifying the change message; and
   terminating the change message at the first repository in response to determining the change message has previously been received at the first repository; otherwise republishing the change message from the first repository to another repository in the cluster.

2. The method of claim 1, wherein receiving the change message further comprises:
   receiving a change indicator at the first repository from the second repository;
   polling the second repository for change messages; and
   reading the change message from the second repository.

3. The method of claim 2, wherein reading the change message from the second repository comprises:
   determining that multiple change messages exist at the second repository;
   selecting one or more additional change messages that are newer than a particular point in time; and
   reading the selected one or more additional change messages.

4. The method of claim 2, wherein reading the change message from the second repository further comprises:
   reading a checksum of the change message, where the checksum is the value identifying the change message;
   determining from the checksum if the change message has previously been received at the first repository; and
   if the message is not previously known, reading the entire change message.

5. The method of claim 1, wherein republishing the change message comprises:
   processing the change message; and
   forwarding the change message.

6. The method of claim 5, wherein processing the change message further comprises:
   determining that the state indicated in the change message is different than a local state of the first repository; and
   changing the local state to synchronize the first repository with the state indicated in the change message.

7. The method of claim 1, wherein republishing the change message further comprises:
   accepting the change message, including changing a local state of the first repository to synchronize the first repository with the state indicated in the change message;
   determining that a rank of the first repository is higher than the rank of the change message;
   generating an updated change message, identical to the received change message, except that the rank of the updated change message is altered to be equal to the rank of the first repository; and
   sending the updated change message to another repository in the cluster.

8. The method of claim 1, wherein republishing the change message further comprises:
   determining that a rank of the first repository is higher than the rank of the change message;
   determining that the state indicated in the change message conflicts with a local state of the first repository;
   rejecting the change message in response to determining that the first repository has a higher rank than the change message and that the state indicated in the change message conflicts with the local state of the first repository;
   generating a correction message indicating the local state of the first repository; and
   sending the correction message to another repository in the cluster.

9. The method of claim 1, wherein republishing the change message to another repository in the cluster comprises:
   sending the change message back to the second repository.

10. The method of claim 1, wherein republishing the change message to another repository in the cluster comprises:
  republishing to subscriber repositories according to a unique path principle.

11. An article of manufacture comprising a non-transitory machine readable medium having content stored thereon to provide instructions to cause a device to perform operations including:
  polling, from a first repository to a second repository, for a change message published by the second repository, the first and second repositories to participate in a cluster of ranked repositories, where higher ranking is favored if the change message indicates an object state conflict;
  reading the change message from the second repository to receive the change message;
  determining at the first repository whether the change message has previously been received at the first repository by reading a value identifying the change message; and
  terminating the change message at the first repository in response to determining the change message is previously known to the first repository; otherwise
  sending a change message from the first repository to another repository in the cluster in response to receiving the change message.

12. The article of manufacture of claim 11, wherein the content to provide instructions for polling for the change message comprises content to provide instructions for:
  polling the second repository for change messages in accordance with a polling schedule.

13. The article of manufacture of claim 12, wherein the content to provide instructions for polling for the change message comprises content to provide instructions for:
  polling the second repository for change messages in response to receiving a change indication at the first repository from the second repository.

14. The article of manufacture of claim 12, wherein the content to provide instructions for sending the change message from the first repository to the other repository in the cluster comprises content to provide instructions for:
  forwarding the change message to the other repository without changing content of the change message.

15. The article of manufacture of claim 12, wherein the content to provide instructions for sending the change message from the first repository to the other repository in the cluster comprises content to provide instructions for:
  generating a new change message based on a rank of the first repository and the second repository, the new change message to alter at least one characteristic of the original change message; and
  sending the new change message to the other repository in the cluster.

16. A data repository comprising:
  a communication interface to receive a change message from a publisher repository, the data repository and the publisher repositories having a ranking in a cluster or repositories, the change message indicating a change to shared data, where higher ranking is favored if the change message indicates an object state conflict;
  a change message processor coupled to the communication interface, the change message processor comprising circuitry executing with a memory to determine whether the change message is previously known to the data repository including reading a value identifying the change message, and terminate the change message in response to determining the change message is previously known; and
  a publishing module coupled to the change message processor to republish the change message to another data repository in the cluster if the change message is not previously known.

17. The data repository of claim 16, wherein the publishing module further comprises:
  a forwarding module to forward the change message without altering the change message if the change message has a higher rank than the data repository;
  a revalue module to generate an updated change message having the content of the change message altered to have the rank of the data repository if the change message has a lower rank than the data repository and the change message does not conflict with a local data state; and
  a rectification module to generate a new change message having different content than the change message and having the rank of the data repository, if the change message has a lower rank than the data repository and the change message conflicts with a local data state.

18. A system of repositories comprising:
  a publisher repository having a first rank, and including
    a communication interface to send a first change message indicating a change to virtual data of the system, and to receive a second change message,
    a change message processor comprising circuitry executing with a memory to determine whether the second change message is previously known to the publisher repository including reading a value identifying the change message, and terminate the change message in response to determining the change message is previously known, and
    a publishing module to republish the second change message if the second change message is not previously known; and
  a subscriber repository being a subscriber of the publisher repository having a second rank, and including
    a communication interface to receive the first change message,
    a change message processor to determine whether the first change message is previously known to the subscriber repository including reading a value identifying the change message, and terminate the change message in response to determining the change message is previously known, and
    a publishing module to republish the first change message if the first change message is not previously known
  wherein the first and second rank may be the same or different, and wherein higher ranking is favored if a change message indicates an object state conflict.

19. The system of claim 18, wherein the publisher repository is a subscriber of the subscriber repository, and wherein the subscriber repository republishing the first change message generates the second change message.

* * * * *